2 Sheets--Sheet 1.

L. L. BARBER.
Cutting Attachments for Sewing Machines.

No. 156,267. Patented Oct. 27, 1874.

Witnesses
Saml. M. Barton
Chas. Felton Pidgeon

Inventor
Lyman L. Barber
by his Atty.
Samuel D. Wright

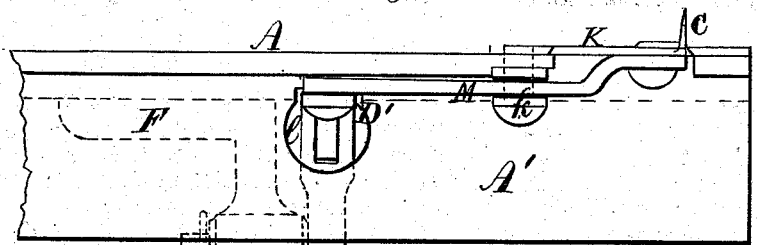
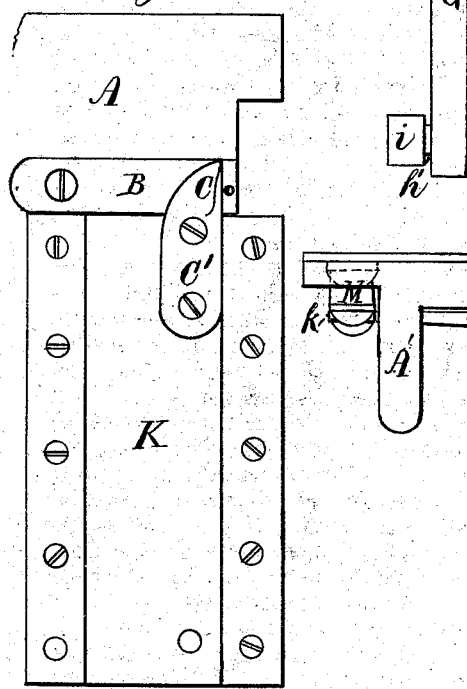
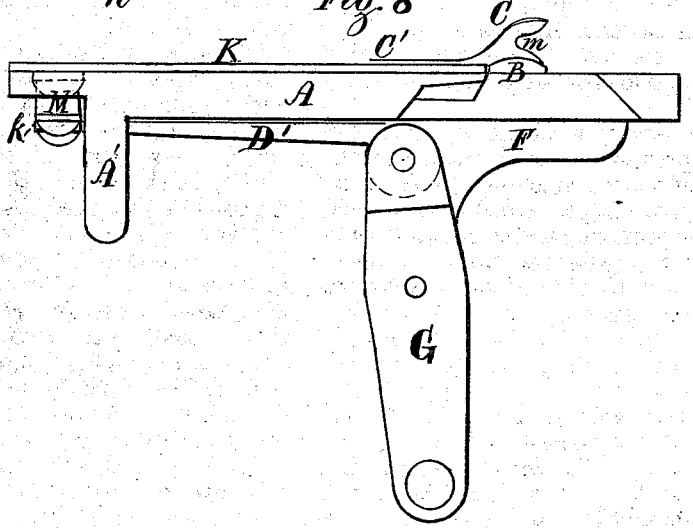

UNITED STATES PATENT OFFICE.

LYMAN L. BARBER, OF BOSTON, MASSACHUSETTS.

IMPROVEMENT IN CUTTING ATTACHMENTS FOR SEWING-MACHINES.

Specification forming part of Letters Patent No. 156,267, dated October 27, 1874; application filed July 28, 1874.

*To all whom it may concern:*

Figures 3, 4, 5, 6:
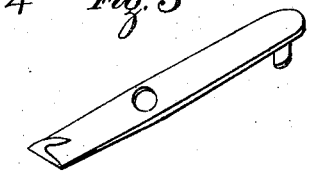
Figure 1:
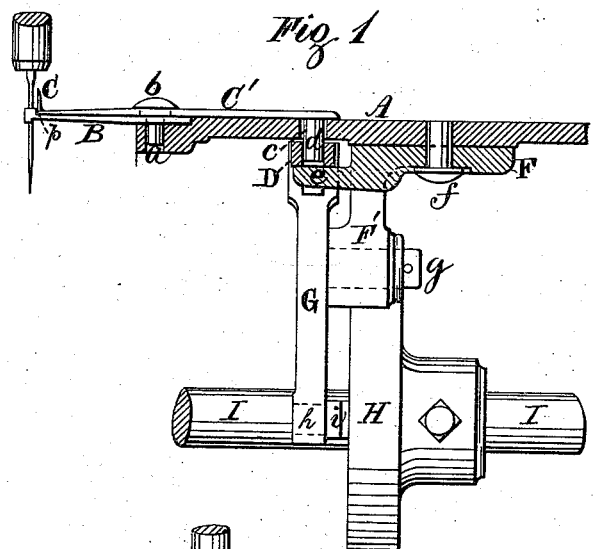
Figure 2:
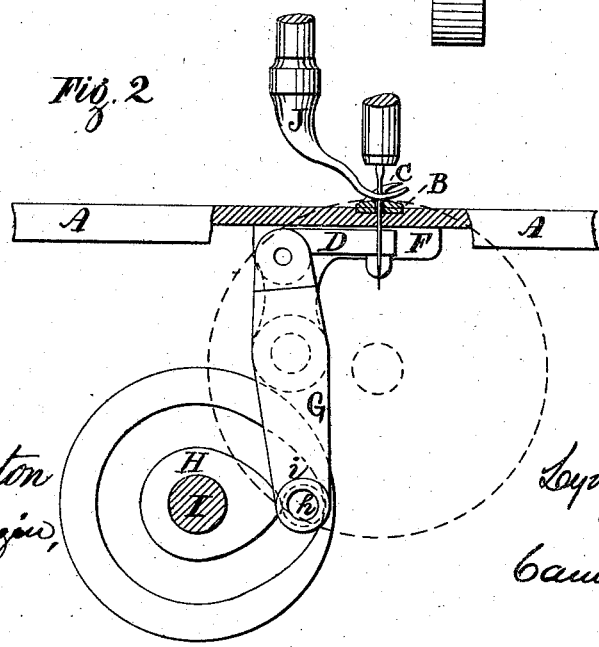

Be it known that I, LYMAN L. BARBER, of Boston, in the county of Suffolk and State of Massachusetts, have invented certain Improvements in Sewing-Machine Cutting or Trimming Attachments, of which the following is a specification:

Figure 1 of the accompanying drawings is a longitudinal vertical section of a portion of a sewing-machine with my improved cutter or trimmer attachment applied. Fig. 2 is a transverse vertical section of the same. Fig. 3 is a perspective view of my improved trimmer. Figs. 4 and 5 are, respectively, a front and side view of the trimmer-blade shown in Fig. 3. Fig. 6 is a front view of a modification of my improved trimmer-blade. Fig. 7 is a side view, Fig. 8 is an end view, and Fig. 9 is a top view, of a portion of a sewing-machine, showing the application of a modification of my invention.

The present invention relates to certain new and useful improvements in trimmer or cutter attachments of sewing-machines; and has for its object the providing an expeditious and efficacious method of cutting and trimming evenly-finished edges of any desired shape; of allowing the ready turning of the stock to facilitate the cutting and trimming of curves and corners or to allow the cutting and trimming of holes; of securely holding the work to facilitate its cutting and trimming; of allowing the ready insertion of the trimmer in any part of the stock to cut and trim it away from, without cutting through, the edge of the material, and of accomplishing other desirable results that will be hereinafter duly explained; and, to effect these ends, my invention consists of a peculiarly-formed knife or trimmer, connected by a series of mechanical devices, arranged and operating as will be duly described, with the operating shaft or lever of a sewing-machine, so as to have a transverse back-and-forth or oscillating lateral movement parallel with the plane of the work, so as to readily cut and trim the stock in the desired manner. This invention also consists in the construction, arrangement, and combination of minor parts, that will be fully explained hereinafter.

In the drawings, A represents the bed of a sewing-machine formed as usual, and to which my improved trimmer or knife C is connected without any alteration of the machine represented, the ordinary screw-hole $a$ of the throat-plate B serving for the fulcrum $b$ of the trimmer or knife shank or plate C′, and the gage-screw hole $c$ serving to receive a small pin, $d$, which drops into a latch, D, supported so as to oscillate on a horn or rest, $e$, of a stand, F, secured to the under side of the bed A by a screw, $f$, engaging in the second gage-screw hole. The stand F is formed with a depending nave-arm, F′, that receives a fulcrum, $g$, of a lever, G, connected at the top with and so as to carry the latch D, and having, at the bottom, a stud, $h$, and roller, $i$, the latter engaging in a face-cam, H, located on and operated by the shaft I of the machine forward of the shuttle-cam. The trimmer or knife-blade C is curved or inclined from the back of the shank or plate C′ upward toward the operator, and is rounded on the back of its upper edge for a certain distance and then sharpened toward a front point. The front of the trimmer or knife-blade C is notched out, as at $m$, and the edges of the notched portion sharpened. Or the blade of the knife or trimmer may be formed to cut a round or other-shaped edge or edges by grooving or otherwise shaping one or both of its sides to cut the desired form of the edge of the stock, or the blade may be inclined to cut a beveled edge. One of these modifications of the blade is shown in Fig. 6, where the blade is grooved on one side, as at $n$, to form a rounded edge to the stock. The knife or trimmer shank or plate C is made thin and rounded on its upper edges. The presser-foot J is bent or curved up and rounded on the bottom at the rear, so that on the front it shall bear, opposite the needle, on the feed like a roll-presser; or the ordinary roll-presser or foot may be used. The throat-plate B is cut down on the top to leave a shoulder, $p$, at the needle-aperture, for the purpose hereinafter mentioned.

The operation of my improvements is as follows: Power being applied, the machine is operated as usual, the shaft I carrying the cam H, which operates the lever G, and, consequently, the latch D, connected, by the pin $d$, with the trimmer or knife-shank C′, so as to oscillate the latter laterally over the bed A, and bring its blade to cut against the leather or other stock, which, during the cutting, is held firmly between the feed and presser-foot, the latter being notched in on the side next to the knife to allow the passage of the needle, and to admit the presser-foot to come even with the needle-plate, which is cut down on the top and forms a shoulder at the needle end, as before described, and thus provides two metallic edges for the knife or trimmer to work against. After the work is fed the knife makes its cut and is carried back laterally, allowing the work to feed easily. The needle descends into the work after the latter is fed along, and, acting like a pin, serves, with the bearing of the presser-foot and feed to prevent the slipping or stretching of the work while the knife is carried laterally forward to make its cut. The trimmer or knife is adjusted in its position so as not to begin its cut until the shuttle has taken and entered its loop far enough to let the loop pass onto the large part of the shuttle. Then the trimmer or knife advances and completes its movement before the shuttle gets through the loop, and while it is at rest and nearly at its lowest descent, thereby holding the work while the knife is making its cut next the shank or strongest part of the needle.

The trimmer or knife, being filed or rounded off on the back part of its upper edge, facilitates the cutting and trimming of curves and corners, as, in turning the work, the back of the knife acts as a cam, and raises the part of the work held next to the needle by the presser-foot, so as to slide up over the knife or trimmer. The knife or trimmer, oscillating on its fulcrum $b$, describes at each cut a small segment of a circle, and facilitates the turning of curves and corners, and allows very small curves and holes to be cut and trimmed, as well as the cutting and trimming of an edge in a straight line.

The notch-shaped front of the trimmer or knife acts like a wedge on the work, which is compressed as it nears the apex or angle of the notch $m$, thereby hardening the stock and facilitating the cutting of soft or spongy material. Moreover, by the notched formation of the knife the edges of the stock are turned in and the roughness or burring of the edges is prevented.

By arranging the trimmer or knife to oscillate or have a forward and back movement laterally over the bed of a machine, in a plane parallel with the work, the space under the arm of the machine is left clear of obstruction for the turning of a boot or shoe or other work, and the trimming operation is conveniently and efficaciously performed.

To compensate for the wear and sharpening of the knife the screw-hole of the stand F is elongated to permit the adjustment of the stand toward or from the operator, to bring the apex of the notch $m$ of the knife, after its cutting movement, even with and opposite to the needle.

By merely unscrewing the fulcrum-screw $b$ the trimmer or knife may be readily detached from the machine to permit the operation for ordinary stitching or for other desired purposes; or knives or trimmers shaped to form hollow, beveled, oval, round, or other edges, or formed to split the edge of leather or other stock or material may, by means of the fulcrum-screw $b$, be readily attached to the machine.

The sharp upward forward point of the trimmer or knife allows its ready insertion in the body at any point without cutting through the edge of the material, thereby permitting the cutting and trimming of holes and lines in any part of the material.

My improved trimmer attachment is applicable to so called wax-thread sewing-machines, or where a hook or barb needle and awl are used, equally as well as to other sewing-machines, it being applied in like manner to be operated by a lever or shaft, and the knife brought near to work in the side curve of the presser-foot, as ordinarily formed for the usual siding or stitching gage. In this case the knife, oscillating laterally and in a parallel plane with the work, does not interfere with the thread-guide; or, the trimmer or knife may be hung so as to be oscillated laterally from the arm of a sewing-machine, or otherwise arranged on a sewing-machine, as preferred, to have an oscillating or forward and back movement laterally on the machine in a plane parallel with the work—as, for instance, a modification of my invention is represented in Figs. 7, 8, and 9 of the drawings, wherein a knife or trimmer is attached to the top at one end of an ordinary shuttle cover or slide, K, of a sewing-machine, which cover or slide K is connected at the other end with a lever, M, turning on a fulcrum, $k$, on the under side of the bed A, and extending longitudinally, and connecting at its end with an arm or extended latch, D', which extends through an aperture, $l$, ordinarily formed in the downward rim A' of the bed, transversely under the bed, and is pivoted to the top of the lever G, arranged as hereinabove described, with a fulcrum, $g$, turning in stand F, and having a stud, $h$, and roller $i$ to engage with a cam, H, Figs. 1 and 2, which cam H operates the lever G, and consequently the latch D' and lever M, so as to carry back and forth the shuttle cover or slide K and knife or trimmer transversely with the bed of the machine on a parallel plane with the work, thus producing a reciprocating action by which the knife or trimmer accomplishes the same results as when operated by the arrangement of devices hereinbefore described.

Having thus fully described my improvements, what I claim as my invention, and desire to have secured to me by Letters Patent, is—

1. A sewing-machine knife or trimmer at the end of a horizontal plate or shank, inclined or curved upward from the back toward the operator, and rounded on the top edge the front, where it is sharpened to a point, and having its front notched in and sharpened, and its sides shaped to trim any desired form of edge on the work, substantially as and for the purposes specified.

2. A sewing-machine presser-foot, having its rear portion bent or curved up, and rounded on the bottom, in combination with a needle-plate cut down on the top to form a shoulder at the needle-aperture, and a notched knife or trimmer, C, all constructed, arranged, and operating substantially as and for the purposes specified.

3. In a sewing-machine, a knife or trimmer projecting above the top of the base, and operated substantially as described, so as to have a back-and-forth motion in the line of the feed of the machine, substantially as and for the purpose set forth.

4. A sewing-machine knife or trimmer, constructed and arranged as described, in combination with a latch, D, stand F, lever G having stud h, and roller i, cam H, and shaft I, all constructed, arranged, and operating substantially as described.

In testimony whereof I have signed my name to this specification in the presence of two subscribing witnesses.

LYMAN L. BARBER.

Witnesses:
  CARROLL D. WRIGHT,
  SAML. M. BARTON.